US011279860B2

(12) United States Patent
Michaud et al.

(10) Patent No.: US 11,279,860 B2
(45) Date of Patent: Mar. 22, 2022

(54) ADHESIVE FILM ACTIVATABLE AT LOW TEMPERATURE

(71) Applicant: Bostik SA, Colombes (FR)

(72) Inventors: Guillaume Michaud, Compiegne (FR); Aurélien Wiegand, Choisy au Bac (FR)

(73) Assignee: BOSTIK SA, Colombes (FR)

( * ) Notice: Subject to any disclaimer, the term of this patent is extended or adjusted under 35 U.S.C. 154(b) by 156 days.

(21) Appl. No.: 16/484,834

(22) PCT Filed: Feb. 22, 2018

(86) PCT No.: PCT/FR2018/050427
§ 371 (c)(1),
(2) Date: Aug. 9, 2019

(87) PCT Pub. No.: WO2018/154246
PCT Pub. Date: Aug. 30, 2018

(65) Prior Publication Data
US 2020/0024495 A1  Jan. 23, 2020

(30) Foreign Application Priority Data

Feb. 23, 2017  (FR) ...................... 1751412

(51) Int. Cl.
| C09J 175/06 | (2006.01) |
| C09J 7/35 | (2018.01) |
| C09J 7/10 | (2018.01) |
| C08G 18/42 | (2006.01) |
| C08G 18/79 | (2006.01) |

(52) U.S. Cl.
CPC ........ *C09J 175/06* (2013.01); *C08G 18/4244* (2013.01); *C08G 18/798* (2013.01); *C09J 7/10* (2018.01); *C09J 7/35* (2018.01); *C09J 2475/00* (2013.01)

(58) Field of Classification Search
CPC ... C09J 175/06; C08G 18/798; C08G 18/4202
See application file for complete search history.

(56) References Cited

U.S. PATENT DOCUMENTS

| 3,475,200 | A | * | 10/1969 | Wilhelm | ............... | C08G 18/10 |
| | | | | | | 428/36.1 |
| 4,251,428 | A | * | 2/1981 | Recker | .................... | C08L 77/00 |
| | | | | | | 524/450 |
| 4,336,365 | A | * | 6/1982 | Reischl | ............... | C07D 229/00 |
| | | | | | | 528/44 |
| 4,894,429 | A | * | 1/1990 | Grogler | ............... | C08G 18/161 |
| | | | | | | 528/45 |
| 7,316,828 | B2 | * | 1/2008 | Abend | ............... | C08G 18/5024 |
| | | | | | | 427/208.4 |
| 10,196,538 | B2 | * | 2/2019 | Maehata | ............... | C09D 167/00 |
| 2004/0204524 | A1 | | 10/2004 | Baumgart et al. | | |
| 2009/0214875 | A1 | | 8/2009 | Paschkowski | | |
| 2011/0236632 | A1 | * | 9/2011 | Hosokawa | ........... | G02B 5/0808 |
| | | | | | | 428/141 |
| 2011/0244158 | A1 | * | 10/2011 | Murakami | .......... | C08G 18/798 |
| | | | | | | 428/35.8 |
| 2011/0274922 | A1 | * | 11/2011 | Yasue | ........................ | C09J 7/29 |
| | | | | | | 428/354 |
| 2015/0252231 | A1 | | 9/2015 | Schulthess et al. | | |
| 2018/0307139 | A1 | * | 10/2018 | Kobayashi | ........... | C09D 11/104 |
| 2019/0143641 | A1 | * | 5/2019 | Imakura | ................. | B41M 5/443 |
| | | | | | | 428/41.8 |

FOREIGN PATENT DOCUMENTS

| CN | 101855070 A | 10/2010 | |
| EP | 1115925 B1 * | 8/2005 | ............... D01F 6/92 |
| EP | 2322445 A1 | 5/2011 | |
| GB | 1119949 A | 7/1968 | |
| JP | 08291279 A | 11/1996 | |
| WO | 2009062602 A1 | 3/2009 | |

OTHER PUBLICATIONS

Kuraray Polyols Datasheet. Kurarau Co. Ltd. https://www.kuraray.eu/fileadmin/product_ranges/polyols/downloads/Polyol_Brochure_2014Dec.pdf (Year: 2014).*
Espacenet Translation of JP H08291279 A (Year: 2021).*
ISA/EP; International Search Report and Written Opinion for International Patent Application No. PCT/FR2018/050427 dated Apr. 30, 2018, 11 pages.
CNIPA, First Office Action in Chinese Patent Application No. 201880013289.7 dated May 7, 2021.

* cited by examiner

*Primary Examiner* — Michael M Dollinger
(74) *Attorney, Agent, or Firm* — NK Patent Law

(57) ABSTRACT

The invention relates to an adhesive composition that can be activated at a low temperature (from 110° C., preferably from 100° C.) and is available in the form of a film, and to the method for the production thereof. The invention also relates to a composition comprising at least one specific polyester polyol and at least one specific polyisocyanate dispersible in said polyester polyol in the presence of at least one specific organic solvent, and to the use of said composition for producing an adhesive composition that can be activated at a low temperature and is available in the form of a film.

13 Claims, No Drawings

ADHESIVE FILM ACTIVATABLE AT LOW TEMPERATURE

CROSS-REFERENCE TO RELATED APPLICATIONS

This application is a U.S. National Stage application of International Patent Application No. PCT/FR2018/050427, filed on 22 Feb. 2018, which claims the benefit of French Patent Application No. 1751412, filed on 23 Feb. 2017.

FIELD OF THE INVENTION

The present invention relates to an adhesive composition activatable at low temperature (from 110° C., preferably from 100° C.), available in film form, and to its process of preparation.

The present invention also relates to a composition comprising at least one specific polyester polyol and at least one specific polyisocyanate dispersed in said polyester polyol in the presence of at least one specific organic solvent, and to the use of said composition in the manufacture of an adhesive composition activatable at low temperature (from 110° C., preferably from 100° C.), available in film form.

TECHNOLOGICAL BACKGROUND

The use of heat-activatable adhesive compositions has numerous applications in various fields of industry. In particular, these compositions can be used in the form of films (also denoted under the term of heat-activatable adhesive films) for the assembling of substrates by adhesive bonding.

The term "heat-activatable" (or "thermally activatable") is understood to mean that the composition (optionally in film form) has latent adhesive properties which are only activated after having heated said composition (or said film) above a given temperature ("activation temperature"). It is during this thermal activation stage that the composition (or film) will develop its adhesive properties.

There are numerous advantages to the use of such compositions. In particular, the adhesion of (the) substrate(s) can be deferred to the desired moment and easily carried out by simple heating or thermal activation.

In addition, the use of adhesive films constitutes an advantageous alternative when the operator does not have available plants or means dedicated to the coating of the adhesive composition. Adhesive films are in addition simple and rapid to employ, in comparison with solvent-based adhesive compositions, for example, the use of which requires the evaporation of the solvent.

In principle, during the adhesive bonding process, the adhesive film is placed between the surfaces of the substrates to be assembled and held in contact with them while the assembly is heated at high temperature in order to melt and thermally activate said film. Generally, the assembly is heated for a relatively short time in order to prevent any thermal degradation of the substrates. This duration can vary according to the thickness of the film. After cooling, an adhesive joint is obtained which provides for the assembling of the substrates.

There currently exist on the market adhesive compositions based on polyol(s) and on blocked isocyanate(s) available in the form of films and having advantageous adhesive properties but exhibiting a very high activation temperature.

The term "blocked isocyanate" is understood to mean a compound having at least one NCO functional group, said NCO functional group(s) having been blocked using a blocking agent or protective agent, in order to prevent it (them) from reacting with other entity (entities) present within the same composition and in particular the OH functional groups of the polyol(s) present in the same composition. When the blocked isocyanate is heated at high temperature, the NCO functional group(s) of said isocyanate will be released and be able to react with the opposing polyol(s) in order to form a polyurethane, having adhesive properties.

The heat-activatable adhesive films resulting from such compositions based on polyol(s) and on blocked isocyanate(s) make it possible to satisfactorily adhesively bond numerous substrates but remain to be improved further with regard to a number of points, in particular from the viewpoint of their activation temperature.

This is because it has been observed that these films have to be heated at high temperatures (above 160° C.) in order to be able to be activated and to fully develop their adhesive properties. Failing that, the adhesive performance qualities of these films will be weak or insufficient to provide for the assembling by adhesive bonding of two substrates.

Furthermore, the necessity to strongly heat the adhesive film in order to activate it is incompatible with the use of certain types of substrates liable to decompose thermally above the activation temperature of said film. Mention may be made, by way of example, of the substrates of polyolefin type, such as polypropylene, which degrades if it is heated above 160° C.

The aim of the present patent application is henceforth to develop novel heat-activatable adhesive compositions, available in the form of films, which can be activated at a lower activation temperature than that of the compositions constituting the abovementioned adhesive films of the market and which have excellent properties of adhesion to varied substrates (metallic or nonmetallic).

Surprisingly, it has been discovered that it is possible to obtain, by a simple preparation process, a heat-activatable adhesive composition, usable in film form and exhibiting the properties desired above, starting from a composition comprising at least one specific polyester polyol, at least one specific polyisocyanate and at least one specific organic solvent, such as are defined below.

In particular, the composition according to the invention makes it possible to manufacture ready-for-use adhesive films which can be rapidly activated at low temperature and which have excellent mechanical and adhesive properties. The adhesive film according to the invention can in particular be heat-activatable at temperatures of less than 150° C., in particular from 110° C., preferably from 100° C.

Furthermore, it has been observed that the composition according to the invention makes it possible to obtain an adhesive film exhibiting, for one and the same type of substrate, improved adhesive properties, in particular in terms of resistance to shearing, in comparison with the films existing on the market.

In addition, it has been observed that the adhesive joint formed after thermal activation starting from the adhesive film according to the invention makes it possible to lastingly assemble two substrates, while maintaining a sufficient level of cohesion to provide for the adhesive bonding of the two substrates, even after having been exposed to heat (up to 40° C.).

In some applications, it is also desirable for the adhesive films to be, in addition, sufficiently flexible to be able to be rolled up and packaged in the form of reels or rolls of suitable dimensions.

In particular, it has been observed that the composition according to the invention exhibits good film-forming properties and makes it possible to obtain a flexible film of homogeneous appearance which is easy to handle and to store.

SUMMARY OF THE INVENTION

Thus, a first subject matter of the invention relates to a composition comprising:
at least one saturated polyester polyol (A), including at least one saturated polyester polyol having a number-average molar mass (denoted Mn1) of greater than or equal to 15 000 g/mol, preferably of greater than or equal to 18 000 g/mol, more preferably of greater than or equal to 21 000 g/mol, more preferably still ranging from 21 000 to 75 000 g/mol and better still ranging from 21 000 to 60 000 g/mol (denoted A1), and
at least one polyisocyanate of uretdione type (B) having at least two NCO groups.

The composition according to the invention can additionally comprise at least one organic solvent (C) capable of dissolving the polyester polyol(s) (A1) without dissolving the polyisocyanate(s) (B).

According to one embodiment, the present invention relates to a composition comprising:
at least one saturated polyester polyol (A), including at least one saturated polyester polyol having a number-average molar mass (denoted Mn1) of greater than or equal to 15 000 g/mol, preferably of greater than or equal to 18 000 g/mol, more preferably of greater than or equal to 21 000 g/mol, more preferably still ranging from 21 000 to 75 000 g/mol and better still ranging from 21 000 to 60 000 g/mol (denoted A1), and
  at least one polyisocyanate of uretdione type (B) having at least two NCO groups;
  optionally at least one organic solvent (C) capable of dissolving the polyester polyol(s) (A) without dissolving the polyisocyanate(s) (B).

A second subject matter of the invention relates to the use of the composition according to the invention to manufacture a heat-activatable adhesive composition, in particular in monolayer or multilayer film form.

In particular, the invention relates to a process for the preparation of a heat-activatable adhesive composition, in particular in monolayer or multilayer film form.

A third subject matter of the invention relates to a heat-activatable adhesive composition, in particular in monolayer or multilayer film form, capable of being obtained starting from the composition according to the invention.

Other subject matters and characteristics or advantages of the present invention will become more clearly apparent on reading the description and the examples.

In the present patent application, unless otherwise indicated:
the amounts expressed in the percentage form correspond to weight/weight percentages;
the hydroxyl number is expressed in milligrams of potassium hydroxide per gram of product (mg KOH/g);
the glass transition temperature (Tg) can be measured in a well-known way, for example according to the standard ASTM E1356-08;
the softening point (sp) can be measured in a well-known way, for example according to the standard ASTM E28-99;
the melting point (mp) can be measured in a well-known way, for example using ordinary differential scanning calorimetry (often denoted by the abbreviation DSC) techniques.

DETAILED ACCOUNT OF THE INVENTION

According to a first subject matter, the invention relates to a composition comprising:
at least one saturated polyester polyol (A), including at least one saturated polyester polyol having a number-average molar mass (denoted Mn1) of greater than or equal to 15 000 g/mol, preferably of greater than or equal to 18 000 g/mol, more preferably of greater than or equal to 21 000 g/mol, more preferably still ranging from 21 000 to 75 000 g/mol and better still ranging from 21 000 to 60 000 g/mol (A1), and
at least one polyisocyanate of uretdione type (B) having at least two NCO groups.

The number-average molar masses of the polyester polyol(s) are calculated in a well-known way with respect to the hydroxyl numbers and to the functionality of the (of each of the) polyester polyol(s).

Preferably, the composition according to the invention comprises:
from 75% to 95% by dry weight of at least one saturated polyester polyol (A), including at least one saturated polyester polyol (A1) as defined above, and
from 5% to 25% by dry weight of at least one polyisocyanate (B) of uretdione type having at least two NCO groups,
said contents being expressed with respect to the total dry weight of the composition according to the invention.

The saturated polyester polyol(s) (A) which can be used according to the invention can be obtained by polycondensation:
of at least one polyester diol, such as ethylene glycol, diethylene glycol, trimethylene glycol, butanediol (1,4-butanediol; 1,2-butanediol; 1,3-butanediol), neopentyl glycol, 2-methyl-1,3-propanediol, hexanediol (hexamethylene glycol), propanediol (propane-1,2-diol, propane-1,3-diol or propylene glycol), trimethylolpropane, cyclohexanedimethanol, or their mixtures, and
of at least one dicarboxylic acid or one of its ester or anhydride derivatives, such as terephthalic acid, dimethyl terephthalate, isophthalic acid, adipic acid, azelaic acid, sebacic acid, cyclohexanedicarboxylic acid, dodecanoic acid (1,10-decanedicarboxylic acid), succinic acid, phthalic anhydride, maleic anhydride and hydroxycarboxylic acids, such as the diesters obtained from polycaprolactone or from ε-caprolactone and from diethylene glycol (called CAPAs), or their mixtures.

The saturated polyester polyol(s) (A) which can be used according to the invention is (are) preferably linear or branched and preferably amorphous or semicrystalline.

The saturated polyester polyol(s) (A) which can be used according to the invention preferably has (have) a glass transition temperature (Tg) ranging from −40 to 70° C., preferably measured according to the standard ASTM E1356-08.

The saturated polyester polyol(s) (A) which can be used according to the invention preferably has (have) a melting point (mp) and/or a softening point (sp) of less than or equal to 160° C., preferably of less than or equal to 130° C., more preferably of less than or equal to 100° C.

The saturated polyester polyol(s) (A) which can be used according to the invention can consist solely of saturated polyester polyol(s) (A1) as defined above or of a mixture of saturated polyester polyols including at least one saturated polyester polyol (A1) as defined above and at least one saturated polyester polyol (A2) different from (A1).

Preferably, the saturated polyester polyol(s) (A1) is (are) semicrystalline and more preferably exhibit(s) a Tg of less than or equal to 0° C., the Tg preferably being measured according to the standard ASTM E1356-08.

Preferably, the (dry) mixture of saturated polyester polyols (A) comprises:
at least one saturated polyester polyol (A1) as defined above, and
at least one saturated polyester polyol (A2) having a hydroxyl number of greater than or equal to 15 mg KOH/g, preferably ranging from 20 to 90 mg KOH/g, more preferably from 30 to 60 mg KOH/g.

According to one embodiment, the composition according to the invention comprises:
at least one saturated polyester polyol (A1) as defined above, preferably a semicrystalline saturated polyester polyol (A1) or a mixture of two amorphous saturated polyester polyols (A1), and
at least one saturated polyester polyol (A2) having a hydroxyl number of greater than or equal to 15 mg KOH/g, preferably ranging from 20 to 90 mg KOH/g, more preferably from 30 to 60 mg KOH/g, said polyester polyol(s) (A2) preferably being amorphous.

Preferably, the ratio by weight of the amount of polyester polyol(s) (A1) to the amount of polyester polyol(s) (A2) present in the mixture of saturated polyester polyols (A) varies from 0.1 to 1, preferably from 0.2 to 1 and more preferably from 0.25 to 0.7.

Preferably, the mixture of saturated polyester polyols (A) comprises:
at least one saturated polyester polyol (A1) which is semicrystalline, preferably, as defined above, and
at least one saturated polyester polyol (A2) which is amorphous, preferably, as defined above.

In the context of the invention, the term "amorphous polyester polyol" is understood to mean a polyester polyol which does not have a crystalline form. It preferably has a degree of crystallinity by weight of less than 10%, preferably of less than 5%, advantageously of less than 2% and more advantageously still of less than 1%.

In the context of the invention, the term "semicrystalline polyester polyol" is understood to mean a polyester polyol comprising crystalline regions and amorphous regions in its structure. It preferably has a degree of crystallinity by weight of at least 20%, preferably of at least 30%, preferentially of at least 40%, and of less than 90%, preferably of less than 80%.

The degree of crystallinity, denoting the proportion of substance in the crystalline state, can be determined by X-ray diffraction analysis at different angles of incidence, by calorimetric measurements, such as DSC (Differential Scanning calorimetry), or by any other technique which makes it possible to estimate the proportion of crystalline phase of the semicrystalline polyester polyol.

Preferably, the (dry) mixture of saturated polyester polyols (A) preferably has a mean OHN ranging from 2 to 65 mg KOH/g, more preferably ranging from 4 to 60 mg KOH/g, more preferably still from 6 to 55 mg KOH/g, in particular from 10 to 50 mg KOH/g and better still ranging from 15 to 45 mg KOH/g.

The polyester polyol(s) (A) which can be used according to the invention is (are) commercially available. Preferably, use is made of polyester polyols of the Vitel® series sold by Bostik, as are illustrated in the examples of the present patent application.

The polyisocyanate(s) of uretdione type (B) which can be used according to the invention is (are) preferably solid at ambient temperature (20° C.) and is (are) provided in the form of particles, the maximum particle size of which is less than 40 µm.

According to one embodiment, the polyisocyanate(s) of uretdione type (B) which can be used according to the invention is (are) solid at ambient temperature (20° C.).

According to one embodiment, the polyisocyanate(s) of uretdione type (B) which can be used according to the invention has (have) a melting point of greater than or equal to 50° C., preferentially of greater than or equal to 100° C., preferably of greater than or equal to 130° C., advantageously of greater than or equal to 140° C. and more advantageously still of greater than or equal to 250° C.

According to one embodiment, the polyisocyanate(s) of uretdione type (B) which can be used according to the invention is (are) provided in the form of particles.

Preferably, the polyisocyanate(s) of uretdione type (B) which can be used according to the invention has (have) a particle size distribution by volume ranging from 0.1 to 40 µm.

Preferably, the polyisocyanate(s) of uretdione type (B) which can be used according to the invention has (have) a mean size (D50) ranging from 1 to 15 µm.

The polyisocyanate(s) of uretdione type (B) which can be used according to the invention preferably has (have) a (D50) of less than or equal to 15 µm, preferably ranging from 0.1 to 15 µm and advantageously ranging from 1 to 15 µm.

D50 is the diameter of the median particle corresponding to 50% (by volume) of the cumulative distribution of the particles, that is to say that, by volume, 50% of the particles have a diameter of less than D50 and 50% of the particles have a diameter of greater than D50.

The D50 and the particle size distribution by volume can be measured according to the standard ISO 13320-2009 ("Particle size analysis—Laser diffraction methods".

Advantageously, the polyisocyanate(s) of uretdione type (B) which can be used according to the invention correspond(s) to the following formula (I):

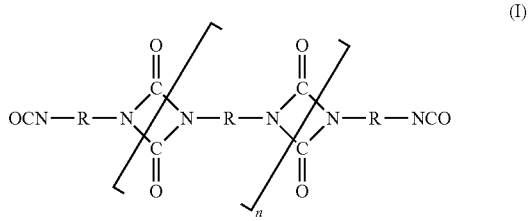

in which:
R is a divalent group comprising from 6 to 13 carbons and n is an integer ranging from 0 to 10.

Preferably, R is a divalent aromatic or polyaromatic group, more preferably resulting from an aromatic diisocyanate, such as toluene diisocyanate (TDI) or diphenylmethane diisocyanate (MDI).

Preferably, R is a divalent hydrocarbon group.

Advantageously, the polyisocyanate(s) of uretdione type (B) which can be used according to the invention correspond(s) to one of the following formulae (I-1) or (I-2):

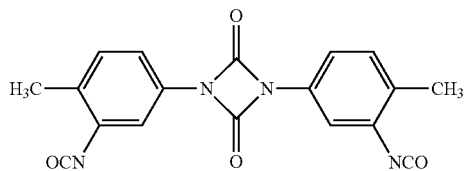

(I-1)

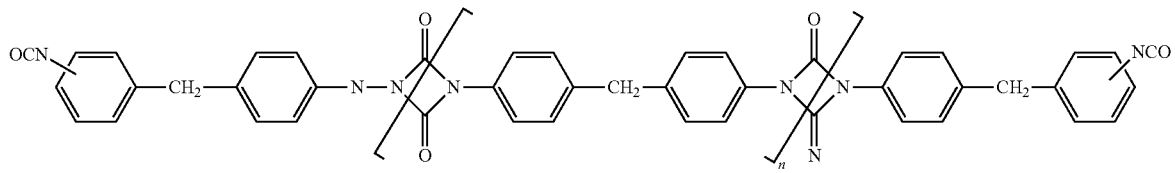

(I-2)

These polyisocyanates advantageously have a melting point which is greater than the activation temperature of the adhesive composition according to the invention.

More preferably, the polyisocyanate(s) of uretdione type (B) which can be used according to the invention is (are) chosen from MDI uretdione dimers and TDI uretdione dimers and more preferably MDI uretdione dimers (n having the value in particular of 1 in the formula (I) above).

Preferably, the polyisocyanate(s) of uretdione type (B) which can be used according to the invention exhibit(s) a content of NCO (denoted % NCO) ranging from 15% to 40% by weight, more preferably from 20% to 35% by weight, with respect to the weight of said polyisocyanate.

The polyisocyanate(s) (B) which can be used according to the invention is (are) commercially available. Mention may be made, by way of example, of the following products:
Addolink® TT (TDI uretdione), sold by Rhein Chemie (% NCO=24%),
Grilbond® A2bond (MDI uretdione), sold by EMS-Griltech (% NCO=30.2%),
as are illustrated in the examples of the present patent application.

According to a preferred embodiment, the polyisocyanate(s) of uretdione type (B) which can be used according to the invention does (do) not comprise an isocyanurate group.

Preferably, the content of polyisocyanate(s) of uretdione type (B) in the composition according to the invention is such that the NCO/OH molar ratio ranges from 0.5 to 1.5, preferably from 0.8 to 1.2, and more preferably is equal to approximately 1. This ratio corresponds to the molar ratio of the number of NCO functional groups to the number of OH functional groups in the composition. The NCO functional groups are contributed by the combined polyisocyanates present in the composition according to the invention and the OH functional groups are contributed by the combined polyester polyols present in the composition according to the invention.

The composition according to the invention can additionally comprise at least one organic solvent (C) capable of dissolving the polyester polyol(s) (A) without dissolving the polyisocyanate(s) of uretdione type (B), in particular under the mixing conditions.

Thus, the organic solvent(s) (C) which can be used according to the invention is (are) preferably such that:
the polyester polyol(s) (A) is (are) soluble(s) in the organic solvent (C). "Soluble in the organic solvent (C)" is understood to mean that it (they) can form a homogeneous composition consisting up to 40% by weight of polyester polyol(s) in the organic solvent (C) and preferably they can form a solution consisting up to 60% by weight of polyester in the organic solvent (C),
the polyisocyanate(s) of uretdione type (B) is (are) insoluble in the organic solvent(s) (C) and in particular in a composition comprising said organic solvent(s) (C) and said polyester polyol(s) (A).

The organic solvent(s) (C) which can be used according to the invention is (are) typically inert with regard to the ingredients included in the composition according to the invention.

The composition according to the invention can comprise from 0% to 60% by weight, preferably from 1 ppm to 50% by weight (i.e., from $10^{-4}$% by weight to 50% by weight) and more preferably from 1 ppm to 40% by weight, of the total weight of said composition, of at least one organic solvent (C) as defined in the present patent application.

Preferably, the composition according to the invention comprises at least 35% by weight of organic solvent(s) (C) and more preferably from 40% to 60% by weight of organic solvent(s) (C), with respect to the total weight of the composition according to the invention, in order to dissolve the polyester polyol(s) (A) and to disperse the polyisocyanate(s) (B) in said solvent-based mixture.

According to one embodiment, the composition according to the invention comprises more than 1 ppm of abovementioned organic solvent(s) (C), preferably more than 10 ppm by weight, preferentially more than 100 ppm by weight, more preferably still more than 1000 ppm by weight and advantageously more than 10 000 ppm by weight of organic solvent(s) (C), with respect to the total weight of said composition.

Preferably, the composition according to the invention comprises more than 30% by weight of abovementioned organic solvent(s) (C), preferably more than 35% by weight, preferentially more than 40% by weight and advantageously more than 45% by weight of organic solvent(s) (C), with respect to the total weight of said composition.

Preferably, the organic solvent or mixture of organic solvents (C) has a solubility parameter, delta (δ) (also known as Hildebrand solubility parameter, HSP), ranging from 6.9 to 10.0 (cal/cm³)$^{1/2}$ and a hydrogen bonding index (HBI), gamma (γ), ranging from 5.0 to 7.7. These parameters are defined in a well-known way in the literature, such as, for example, in sections 38 and 39 of the patent application US 2004/0204524:
the solubility parameter delta is defined in Römpp Lexikon Lacke and Druckfarben, Georg Thieme Verlag, Stuttgart, New York, 1998, "Solubility parameters", pp 361 to 365;

the hydrogen bonding index describes the ability of a solvent molecule to form hydrogen bonds. The donor solvents have a negative hydrogen bonding index and the acceptor solvents have a positive hydrogen bonding index. The hydrogen bonding index is determined according to the deviation of the infrared band for the RO—H stretching band (R. C. Nelson, R. W. Hemwall and G. D. Edwards, Journal of Paint Technology, "Treatment of hydrogen bonding in predicting miscibility", Vol. 42, No. 550, 1970, pp 636 to 643).

Preferably, the organic solvent or mixture of organic solvents (C) has a boiling point of less than or equal to 130° C., preferably of less than or equal to 100° C., more preferably ranging from 50 to 90° C.

Preferably, the organic solvent or mixture of organic solvents (C) has a saturated vapor pressure at 20° C. of greater than 0.5 kPa, preferably of greater than 5 kPa.

Preferably, the organic solvent or mixture of organic solvents (C) is chosen from solvents of the type of ketones, ethers and their mixtures.

Preferably, the organic solvent (C) is chosen from aliphatic ketones, such as acetone, methyl ethyl ketone (MEK), 2-pentanone, 3-pentanone, methyl isobutyl ketone and their mixtures. More preferably, the organic solvent (C) is methyl ethyl ketone.

In addition, the composition according to the invention may or may not comprise at least one optional ingredient chosen from polyols different from the polyester polyols (A), having in particular molar mass or number-average molar mass of less than 5000 g/mol, stabilizers (antioxidant, UV stabilizer, heat stabilizer), catalysts, dyes, pigments, non-stick agents (silica, fatty acid amides, waxes, talc) and their mixtures, subject to not modifying the advantageous properties of the composition according to the invention.

According to a second subject matter, the invention relates to the use of the composition according to the invention to manufacture a heat-activatable adhesive composition.

In particular, the invention relates to a process for the preparation of a heat-activatable adhesive composition comprising the following stages:
E1) preparation of a composition according to the invention by dispersing the polyisocyanate(s) of uretdione type (B) in a composition comprising at least one polyester polyol(s) (A) and at least one organic solvent (C), as are defined above,
E2) removal of the organic solvent (C).

During stage E1), the polyester polyol(s) (A) is (are) dissolved in the organic solvent(s) (C), preferably under hot conditions, for example at a temperature of less than or equal to 160° C., preferably of less than or equal to 130° C., more preferably of less than or equal to 100° C., before introducing, into the composition obtained, the polyisocyanate(s) of uretdione type (B), with rapid stirring, so as to obtain a dispersion. The temperature is, for example, greater than or equal to 50° C., preferably greater than or equal to 60° C. and advantageously greater than or equal to 70° C.

The temperature of the solvent-based mixture can be lowered before introduction of the polyisocyanate(s) of uretdione type (B).

According to a preferred embodiment, the preparation process according to the invention comprises, between stage E1) and E2), a stage E1a) in which the dispersion obtained in stage E1) is put into film form. For this, the dispersion is applied as a uniform layer to a non-stick surface, such as a silicone-treated surface. Application can be carried out in particular using a film applicator or bar coater. On conclusion of stages E1), E1a) and E2), a heat-activatable adhesive composition in monolayer film form is advantageously obtained.

According to an alternative form of this preferred embodiment, stages E1a) and E2) can be repeated, so as to obtain a heat-activatable adhesive composition in multilayer film form.

According to one embodiment, the process for the preparation of a heat-activatable adhesive composition comprising the following stages:
i) dissolution of the polyester polyol(s) (A) as defined above in the abovementioned organic solvent(s) (C), preferably under hot conditions, for example at a temperature of less than or equal to 160° C., preferably of less than or equal to 130° C., more preferably of less than or equal to 100° C., said temperature advantageously being between 50° C. and 160° C.;
ii) optional lowering of the temperature of the solvent-based mixture, for example to a temperature ranging from 40° C. to 100° C., preferably from 40° C. to 80° C., and advantageously to a temperature ranging from 40° C. to 60° C.;
E1) dispersion of the abovementioned polyisocyanate(s) of uretdione type (B) in a composition comprising at least one polyester polyol(s) (A) and at least one organic solvent (C), as are defined above;
optional E1a), in which the dispersion obtained in stage E1) is put into film form;
E2) removal of the organic solvent (C).

According to a third subject matter, the invention relates to a heat-activatable adhesive composition, in particular in monolayer or multilayer film form, capable of being obtained starting from the composition according to the invention.

The heat-activatable adhesive composition according to the invention comprises:
at least 75% by weight of at least one saturated polyester polyol (A) as defined above, including at least one saturated polyester polyol (A1) as defined above,
from 5% to 25% by weight of at least one polyisocyanate of uretdione type (B) having at least two NCO groups, as defined above, and
less than 0.5% by weight, preferably less than 0.1% by weight, preferentially less than 0.01% by weight and advantageously less than 0.001% by weight of at least one organic solvent (C), as defined above, with respect to the total weight of the adhesive composition according to the invention.

According to one embodiment, the heat-activatable adhesive composition comprises more than 1 ppm of at least one organic solvent (C) as defined above, preferably more than 10 ppm and advantageously more than 100 ppm, by weight, with respect to the total weight of said adhesive composition according to the invention.

In the context of the invention, ppm is understood to mean "part per million". It is ppm by weight.

The heat-activatable adhesive composition according to the invention can additionally comprise at least one optional ingredient as defined above.

The heat-activatable adhesive film according to the invention preferably has a total thickness ranging from 3 µm to 500 µm. In the case of a monolayer film, the thickness of the film preferably ranges from 3 µm to 120 µm. In the case of a multilayer film, the thickness of the film preferably ranges from 3 µm to 500 µm.

The heat-activatable adhesive films according to the invention are ready-for-use and can be rapidly crosslinked on a substrate or between several substrates, unlike solvent-based adhesive compositions, which have to be dried before crosslinking. It has been observed that, for an adhesive film according to the invention with a thickness of 100 μm, the crosslinking time is approximately 10 min at 100° C.

The following examples are given purely by way of illustration of the invention and should not be interpreted in order to limit the scope thereof.

EXAMPLES

The following ingredients were used:
as polyester polyol (A.1):
- V7200: Vitel® 7200, sold by Bostik: semicrystalline saturated polyester polyol having a glass transition temperature Tg equal to −40° C. and an OHN ranging from 3 to 5 mg KOH/g,
- V3550: Vitel® 3550B, sold by Bostik: amorphous saturated polyester polyol having a glass transition temperature Tg equal to −11° C., a weight-average molecular weight ($M_w$) equal to 75 000 g/mol and an OHN ranging from 3 to 6 mg KOH/g,
- V3330: Vitel® 3330B, sold by Bostik: amorphous saturated polyester polyol having a glass transition temperature Tg equal to 16° C., a weight-average molecular weight ($M_w$) equal to 70 000 g/mol and an OHN ranging from 3 to 6 mg KOH/g,
- V2700: Vitel® 2700B, sold by Bostik: amorphous saturated polyester polyol having a glass transition temperature Tg equal to 50° C., a weight-average molecular weight ($M_w$) equal to 74 000 g/mol and an OHN ranging from 2 to 5 mg KOH/g,
- V2200: Vitel® 2200B, sold by Bostik: amorphous saturated polyester polyol having a glass transition temperature Tg equal to 69° C., a weight-average molecular weight ($M_w$) equal to 47 500 g/mol and an OHN ranging from 3 to 5 mg KOH/g, as polyester polyol (A.2) or other polyol, different from (A.1):
- V5833: Vitel® 5833B, sold by Bostik: polyester polyol having a glass transition temperature Tg equal to 48° C., a weight-average molecular weight ($M_w$) equal to 9800 g/mol and an OHN ranging from 37 to 55 mg KOH/g,
- P1: Baycoll® AD 5027, sold by Covestro (polyester polyol having an OHN ranging from 23 to 33 mg KOH/g),
- P2: Dynacoll® 7360, sold by Evonik (polyester polyol having an OHN ranging from 27 to 34 mg KOH/g and a melting point equal to 55° C.),
- P3: Dynacoll® 7320, sold by Evonik (polyester polyol having an OHN ranging from 27 to 34 mg KOH/g and a glass transition temperature Tg=−20° C.),
- P4: Dynacoll® 7230, sold by Evonik (polyester polyol having an OHN ranging from 27 to 34 mg KOH/g and a glass transition temperature Tg=−30° C.),
- P5: Capa® 2054, sold by Perstorp (polyester polyol having an OHN ranging from 200 to 215 mg KOH/g and a melting point ranging from 18 to 23° C.),
- P6: Diexter® G235, sold by Coim (polyester polyol having an OHN ranging from 54 to 58 mg KOH/g),
- P7: Dianol® 320, sold by Arkema (polyether polyol: Diethoxylated bisphenol A having an OHN equal to approximately 325 mg KOH/g),
- P8: Carbowax® PEG 4000, sold by Dow (polyether polyol: polyethylene glycol having an OHN ranging from 25 to 32 mg KOH/g),
- P9: Diethylene Glycol (DEG) (polyether polyol having an OHN equal to approximately 1057 mg KOH/g),
- P10: Desmophen® C1100, sold by Covestro (polyester polyol having an OHN ranging from 198 to 238 mg KOH/g).

as polyisocyanate (B):
- UR1: Addolink® TT, sold by Rhein Chemie (TDI uretdione, having a melting point of greater than 140° C. and a content of TDI monomers of less than 0.1%),
- UR2: Grillbond® A2bond, sold by EMS-GRILTECH (MDI uretdione having a melting point approximately equal to 260° C.), as organic solvent (C) or comparative organic solvent:
- MEK: Methyl Ethyl Ketone,
- DCM: Dichloromethane,
- AcOEt: Ethyl acetate.

Preparation of the Solvent-Based Compositions According to the Invention:

The compositions of examples 1 to 9 according to the invention are prepared from the ingredients described in table 1 below, mixed with 40% by weight of an organic solvent S1 with respect to the weight of the mixture.

The contents shown in table 1 are expressed in grams (g) and, if appropriate, as percent by dry weight with respect to the weight of the solvent-free composition (% dry).

In the compositions of examples 1-9, the ratio by weight A.1/A.2 varies from 0.25 to 0.67 approximately.

Procedure:

The polymers (polyester polyols and optional other polyols) and the organic solvent in the mixture are introduced into a glass reactor of appropriate capacity equipped with a reflux condenser, and then the combined mixture is heated at 70° C. with slow stirring for approximately 10 hours until the polymers are dissolved.

When the polymers are dissolved, the solution is cooled to 55° C. The polyisocyanate is subsequently introduced and then the mixture is transferred into a suitable receptacle and placed under rapid stirring using a high-speed mixer for two times 1 minute at 2000 revolutions per minute (rev/min).

TABLE 1

| | | Compositions according to the invention | | | | | | | | |
|---|---|---|---|---|---|---|---|---|---|---|
| | Ingredients | Ex. 1 | Ex. 2 | Ex. 3 | Ex. 4 | Ex. 5 | Ex. 6 | Ex. 7 | Ex. 8 | Ex. 9 |
| (A.1) | V7200 | 36.84 g (36.84% dry) | 37.44 g (37.44% dry) | 31.89 g (31.89% dry) | 33.93 g (33.93% dry) | 33.90 g (33.90% dry) | 60.03 g (17.5% dry) | — | — | — |
| | V3550 | — | — | — | — | — | — | — | 19.12 g (7.4% dry) | 11.58 g (7.5% dry) |
| | V3300 | — | — | — | — | — | — | 19.12 g (7.4% dry) | — | — |

TABLE 1-continued

| | | Compositions according to the invention | | | | | | | | |
|---|---|---|---|---|---|---|---|---|---|---|
| | Ingredients | Ex. 1 | Ex. 2 | Ex. 3 | Ex. 4 | Ex. 5 | Ex. 6 | Ex. 7 | Ex. 8 | Ex. 9 |
| (A.2) and other polyols | V2700 | — | — | — | — | — | — | — | 76.47 g (29.3% dry) | 46.32 g (29.9% dry) |
| | V2200 | — | — | — | — | — | — | 76.47 g (29.3% dry) | — | — |
| | V5833 | 55.26 g (55.26% dry) | 56.15 g (56.15% dry) | 47.84 g (47.84% dry) | 50.89 g (50.89% dry) | 50.86 g (50.89% dry) | 240.06 g (69.9% dry) | 143.39 g (55.0% dry) | 143.39 g (55.0% dry) | 86.85 g (56% dry) |
| | P1 | — | — | — | 7.44 g (7.44% dry) | — | — | — | — | — |
| | P9 | — | — | 4.11 g (4.11% dry) | — | — | — | — | — | — |
| | P10 | — | — | — | — | 7.43 g (7.43% dry) | — | — | — | — |
| | Total in (A) | 92.1 g (92.1% dry) | 93.59 g (93.6% dry) | 79.73 g (79.73% dry) | 92.26 g (92.26% dry) | 92.1 g (92.1% dry) | 300.09 g (87.4% dry) | 238.94 g (91.6% dry) | 238.94 g (91.6% dry) | 144.75 g (93.3% dry) |
| (B) | UR1 | 7.9 g (7.9% dry) | — | — | — | — | 43.46 g (12.7% dry) | 22.04 g (8.4% dry) | 22.04 g (8.4% dry) | — |
| | UR2 | — | 6.41 g (6.41% dry) | 16.16 g (16.16% dry) | 7.74 g (7.74% dry) | 7.81 g (7.81% dry) | — | — | — | 10.51 g (6.8% dry) |
| | Total as dry | 100 g (100% dry) | 100 g (100% dry) | 100 g (100% dry) | 100 g (100% dry) | 100 g (100% dry) | 343.55 g (100% dry) | 260.98 g (100% dry) | 260.98 g (100% dry) | 155.26 g (100% dry) |
| (C) | MEK | 66.67 g | 66.67 g | 66.67 g | 66.67 g | 66.67 g | 200.02 g | 238.98 g | 238.98 g | 144.75 g |
| | Total in solvent | 166.67 g | 166.67 g | 166.67 g | 166.67 g | 166.67 g | 543.57 g | 499.96 g | 499.96 g | 300.01 g |

Preparation of the Solvent-Based Comparative Compositions:

The compositions of comparative examples CE1 and CE2 correspond to adhesive compositions in the form of films based on Vitel® and on a compound B') different from the compound B) used according to the invention (the compound B' is not a polyisocyanate of uretdione type). These adhesive films are sold under the names F10-316 and F10-300 by Bostik.

The compositions of comparative examples CE3 to CE12 were prepared in the same way as the compositions of examples 1 to 9 according to the invention, by following the procedure described above. The polymers used are the polyols P1 to P8:

In particular, the compositions of comparative examples CE3 to CE10 each correspond to the composition of example 1 according to the invention in which all of the polyester polyols (A) have been replaced, in an equal amount, with a polyol P1 to P8 as described above, chosen from polyester polyols and polyether polyols, the natures and the contents of the other ingredients otherwise being identical.

In particular, the compositions of comparative examples CE11 and CE12 each correspond to the composition of example 1 according to the invention in which the organic solvent S1 has been replaced, in an equal amount, with an organic solvent S2 or S3 respectively, the natures and the contents of the other ingredients otherwise being identical.

TABLE 2

| | | Comparative compositions | | | | | | | | | |
|---|---|---|---|---|---|---|---|---|---|---|---|
| | Ingredients | CE3 | CE4 | CE5 | CE6 | CE7 | CE8 | CE9 | CE10 | CE11 | CE12 |
| (A.1) | V7200 | — | — | — | — | — | — | — | — | 36.84 g (36.84% dry) | 36.84 g (36.84% dry) |
| (A.2) and other polyols | V5833 | — | — | — | — | — | — | — | — | 55.26 g (55.26% dry) | 55.26 g (55.26% dry) |
| | P1 | 92.1 g (92.1% dry) | — | — | — | — | — | — | — | — | — |
| | P2 | — | 92.1 g (92.1% dry) | — | — | — | — | — | — | — | — |

TABLE 2-continued

| | Ingredients | | CE3 | CE4 | CE5 | CE6 | CE7 | CE8 | CE9 | CE10 | CE11 | CE12 |
|---|---|---|---|---|---|---|---|---|---|---|---|---|
| | P3 | | — | — | 92.1 g (92.1% dry) | — | — | — | — | — | — | — |
| | P4 | | — | — | — | 92.1 g (92.1% dry) | — | — | — | — | — | — |
| | P5 | | — | — | — | — | 92.1 g (92.1% dry) | — | — | — | — | — |
| | P6 | | — | — | — | — | — | 92.1 g (92.1% dry) | — | — | — | — |
| | P7 | | — | — | — | — | — | — | 92.1 g (92.1% dry) | — | — | — |
| | P8 | | — | — | — | — | — | — | — | 92.1 g (92.1% dry) | — | — |
| (B) | UR1 | | 7.9 g (7.9% dry) | 7.9 g (7.9% dry) | 7.9 g (7.9% dry) | 7.9 g (7.9% dry) | 7.9 g (7.9% dry) | 7.9 g (7.9% dry) | 7.9 g (7.9% dry) | 7.9 g (7.9% dry) | 7.9 g (7.9% dry) | 7.9 g (7.9% dry) |
| | Total as dry | | 100 g (100% dry) | 100 g (100% dry) | 100 g (100% dry) | 100 g (100% dry) | 100 g (100% dry) | 100 g (100% dry) | 100 g (100% dry) | 100 g (100% dry) | 100 g (100% dry) | 100 g (100% dry) |
| solvents | MEK | | 66.67 g | 66.67 g | 66.67 g | 66.67 g | 66.67 g | 66.67 g | 66.67 g | 66.67 g | — | — |
| | DMC | | — | — | — | — | — | — | — | — | 66.67 g | — |
| | AcOEt | | — | — | — | — | — | — | — | — | — | 66.67 g |
| | Total in solvent | | 166.67 g | 166.67 g | 166.67 g | 166.67 g | 166.67 g | 166.67 g | 166.67 g | 166.67 g | 166.67 g | 166.67 g |

Preparation of the Films Starting from the Compositions Prepared in Examples 1-9 and CE3 to CE11:

A film of the dispersion of polyisocyanate in the solvent-based solution of polyester polyols is drawn over silicone-treated paper using a 500 μm film applicator. The film is left under suction for a minimum of one night in order to evaporate the organic solvent.

Evaluation of the Quality of the Films (Maintenance and Flexibility):

After evaporation of the solvent, the film as prepared above is detached by hand from the silicone-treated paper. Once detached, the flexibility of the film is tested by taking back the ends of the opposite edges of the film in the direction of the length, so as to roll it up into a cylinder.

It was observed that the compositions of examples 1-9 according to the invention made it possible to obtain a self-supported film which is sufficiently flexible to be able to be put into the form of a roll. In particular, it was noted that the compositions of examples 1 to 5 exhibited a better quality of mixing and were more film-forming, thus making a possible to obtain a thinner and more homogeneous film.

The commercial films of examples CE1 and CE2 also exhibit satisfactory properties in terms of flexibility.

On the other hand, none of the compositions of comparative examples CE3 to CE12 made it possible to obtain a flexible self-supported film. This is because the compositions of examples CE3 to CE10 were too friable to be lifted off from the silicone-treated support. With regard to examples CE11 and CE12, the composition set solid before even being able to be cast in film form.

Preparation of the Test Specimens from the Films:

A sample of the film with a length of 25 mm and a width of 12.5 mm is cut out and placed between two staggered rigid supports, with the same dimensions. The two supports can be made of wood or of aluminum. The assemblage is gripped using a clamp and placed in an oven at 100° C. for 10 minutes, during which the film will melt and crosslink. On conclusion of this thermal activation stage, an adhesive joint is formed between the two supports.

Test of Resistance to Shearing of the Adhesive Joint (Standard ISO 4587):

The shear stress bringing about the failure of the adhesive joint is measured.

The principle of this measurement consists in stressing a test specimen of standard shape such as prepared above, consisting of the adhesive composition crosslinked between two rigid supports made of aluminum, in a tensile testing device, the movable jaw of which moves at a constant rate, and in recording the stress applied at the moment when failure of the test specimen occurs.

The maximum force measured at failure is evaluated at different times and under different storage conditions, after thermal activation:

initial: after the test specimen has returned to ambient temperature after thermal activation, 1 week at 23° C.: after storage of the test specimen at 23° C. for 1 week, 1 week at 40° C.: after storage of the test specimen at 40° C. for 1 week.

The results are expressed in megapascals (MPa) and are recorded in table 3 below. Each of the values below corresponds to a mean value calculated for measurements carried out on five identical test specimens.

It is observed that the compositions of examples 1 to 5 according to the invention make it possible to obtain an adhesive film exhibiting improved adhesive properties, in comparison with the adhesive films of the market. The adhesive performance qualities observed (Ex. 1-5) are furthermore maintained at a satisfactory level even after storing at ambient temperature for 1 week to 1 month. The adhesive performance qualities observed (Ex. 2) are also retained at a satisfactory level even after lengthy exposure to heat (1 week at 40° C.).

TABLE 3

Resistance to shearing in MegaPascals

|  |  | MPa |
|---|---|---|
| Initial | Ex. 1 | 10.7 |
|  | Ex. 2 | 12.9 |
|  | Ex. 3 | 11.2 |
|  | Ex. 4 | 7.3 |
|  | Ex. 5 | 8.7 |
| 1 week at 23° C. | Ex. 1 | 10.2 |
|  | Ex. 2 | 12.2 |
|  | CE1 | 4.5 |
|  | CE2 | 4.5 |
| 1 week at 40° C. | Ex. 2 | 11.8 |
| 1 month at 23° C. | Ex. 3 | 12.2 |
|  | Ex. 4 | 10.5 |
|  | Ex. 5 | 11.8 |

In the same way, rigid supports made of wood of the same size as above were successfully adhesively bonded using the test specimens resulting from the compositions of examples 1 to 5 according to the invention.

Thus, in the light of the above, it was observed that all of the compositions according to the invention make it possible to easily obtain an adhesive film exhibiting good adhesive properties on varied substrates and exhibiting sufficient maintenance and flexibility to be able to be easily handled and stored.

In particular, it was observed that the compositions according to the invention make it possible to obtain an adhesive film exhibiting improved adhesive properties, in comparison with the adhesive films of the market, in particular on a metallic substrate.

In particular, it was observed that the compositions according to the invention make it possible to obtain an adhesive film exhibiting long-lasting adhesive properties.

In particular, it was observed that the adhesive performance qualities could also be retained after lengthy exposure to heat.

The invention claimed is:

1. A composition comprising:
   at least one saturated polyester polyol (A), including at least one saturated polyester polyol having a number-average molar mass (denoted Mn1) of greater than or equal to 15,000 g/mol (denoted A1), and
   at least one polyisocyanate of uretdione type (B) having at least two NCO groups,
   at least one organic solvent (C) capable of dissolving the polyester polyol(s) (A) without dissolving the polyisocyanate(s) of uretdione type (B), wherein the composition comprises 30% to 60% by weight of the at least one organic solvent, with respect to the total weight of said composition, and wherein the at least one organic solvent (C) is chosen from solvents of the type of ketones, ethers, and their mixtures.

2. The composition as claimed in claim 1, comprising:
   from 75% to 95% by dry weight of at least one saturated polyester polyol (A), including at least one saturated polyester polyol (A1) having a number-average molar mass (denoted Mn1) of greater than or equal to 15,000 g/mol, with respect to the total dry weight of the composition, and
   from 5% to 25% by dry weight of at least one polyisocyanate (B) of uretdione type having at least two NCO groups, with respect to the total dry weight of the composition.

3. The composition as claimed in claim 1, wherein the polyester polyol(s) (A) is (are) amorphous or semicrystalline.

4. The composition as claimed in claim 1, wherein the saturated polyester polyol(s) (A1) is (are) semicrystalline and exhibit(s) a Tg of less than or equal to 0° C.

5. The composition as claimed in claim 1, wherein the saturated polyester polyol (A) is a mixture of saturated polyester polyols additionally comprising at least one saturated polyester polyol (A2) different from (A1) having a hydroxyl number of greater than or equal to 15 mg KOH/g.

6. The composition as claimed in claim 5, wherein the saturated polyester polyol(s) (A2) is (are) amorphous.

7. The composition as claimed in claim 1, wherein the polyisocyanate(s) of uretdione type (B) is (are) solid at ambient temperature (20° C.) and/or is (are) provided in the form of particles, the maximum particle size of which is less than 40 µm.

8. The composition as claimed in claim 1, wherein the polyisocyanate(s) of uretdione type (B) correspond(s) to the following formula (I):

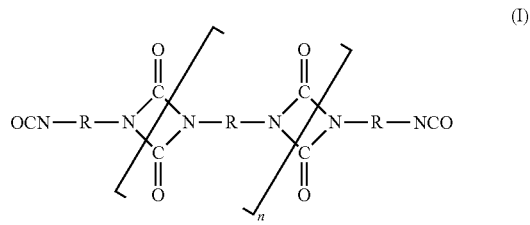

wherein:
   R is a divalent group comprising from 6 to 13 carbons and
   n is an integer ranging from 0 to 10.

9. The composition as claimed in claim 1, wherein the polyisocyanate(s) of uretdione type (B) is (are) chosen from MDI uretdione dimers and TDI uretdione dimers.

10. The composition as claimed in claim 1, wherein the content of polyisocyanate(s) of uretdione type (B) is such that the NCO/OH molar ratio ranges from 0.5 to 1.5.

11. A heat-activatable adhesive composition, in monolayer or multilayer film form, the film having a total thickness ranging from 3µm to 500 µm, comprising:
    at least 75% by weight of at least one saturated polyester polyol (A) as defined in claim 1, including at least one saturated polyester polyol (A1) as defined in claim 1,
    from 5% to 25% by weight of at least one polyisocyanate of uretdione type (B) having at least two NCO groups, as defined in claim 1, and
    less than 0.5% by weight of at least one organic solvent (C), as defined in claim 1, with respect to the total weight of the adhesive composition.

12. The composition as claimed in claim 1, wherein the organic solvent (C) is a ketone and is selected from the group consisting of aliphatic ketones.

13. The composition as claimed in claim 12, wherein the aliphatic ketones are selected from the group consisting of acetone, methyl ethyl ketone (MEK), 2-pentanone, 3-pentanone, methyl isobutyl ketone and their mixtures.

* * * * *